United States Patent [19]
Severini et al.

[11] 4,001,349
[45] Jan. 4, 1977

[54] IMPACT RESISTANT POLYSTYRENE AND A PROCESS FOR ITS PRODUCTION

[75] Inventors: Febo Severini; Carlo Tavazzani, both of Milan; Piero Delle Ville, Novara, all of Italy

[73] Assignee: Montedison S.p.A., Milan, Italy

[22] Filed: Apr. 11, 1975

[21] Appl. No.: 567,312

[30] Foreign Application Priority Data

Apr. 12, 1974 Italy .................................. 21367/74

[52] U.S. Cl. ............................................. 260/878 R
[51] Int. Cl.$^2$ .............. C08F 255/04; C08F 255/06; C08L 23/26
[58] Field of Search ............................... 260/878 R

[56] References Cited

FOREIGN PATENTS OR APPLICATIONS 658,005  2/1963  Canada .......................... 260/878 R

*Primary Examiner*—Alan Holler

[57] ABSTRACT

Crude graft products of styrene on polyolefinic rubbers in which, in the gel, the polystyrene/polyolefinic rubber ratio is shifted to relatively high polystyrene contents, always higher than 1:1, and which graft products are characterized by a satisfactory, which is to say commercially acceptable, distribution of the rubber particles in the polystyrene matrix are obtained by subjecting a solution of a polyolefinic rubber or elastomer in styrene to polymerizing conditions in aqueous phase in the presence of a radical initiator and of a chain transfer agent.

3 Claims, No Drawings

IMPACT RESISTANT POLYSTYRENE AND A PROCESS FOR ITS PRODUCTION

THE PRIOR ART

Graft copolymers of styrene on saturated polyolefinic elastomers consisting of elastomeric copolymers of ethylene and alpha-olefins containing from 3 to 6 carbon atoms (EPR) and graft copolymers of styrene on low-unsaturation terpolymers of ethylene, at least one alpha-olefin containing from 3 to 6 carbon atoms and at least one diene or polyene hydrocarbon, e.g., ethylene/propylene/diene terpolymers (EPDM) are known in the art.

The graft polymerization of styrene on an EPR or EPDM elastomer is known, as is the fact that it can be accomplished, conveniently, by heating a solution of the elastomer in styrene. For instance, Montedison Italian Patent No. 696,119 describes impact-resistant compositions which consist of a mixture of polystyrene with a product resulting from the graft polymerization of styrene on a polyolefinic rubber by a bulk polymerization single-phase process which consists in heating a solution of the polyolefinic rubber in styrene in the absence of diluents.

According to the technique generally followed heretofore, the graft polymerization of styrene on a polyolefinic rubber has been carried out in two stages: a first bulk polymerization phase and then completion of the reaction in an aqueous suspension, resulting in production of the end-product in the form of pearls.

By operating according to that technique. which is described, for instance, by M. Baer in Journ. of Applied Polymer Science, Vol. 16 (1972) pp 1125 – 1138, the graft reaction of styrene on EPR elastomers results in crude graft products which contain a fraction which is insoluble in methylethyl-ketone and in n-heptane and in which fraction the polystyrene/rubber ratio is about 1:1. That fraction, referred to herein as "gel", is comprised, prevailingly, of a graft copolymer of styrene on the rubber which can also comprise varying quantities of free polystyrene. In practice, the quantity of combined rubber contained in such gels does not exceed 70% of the starting rubber.

If, following the same technique, styrene is graft-polymerized on an EPDM elastomer containing from 3 to 9% by weight of the termonomer 5-ethylidene-2-norbornene (ENB) crude graft products are obtained in which the content of combined rubber present in the gel is greater than 90% of the starting rubber. However, the polystyrene/rubber ratio of the gel present in that crude product is also about 1:1.

It is known that in the polymerization of styrene on a diene rubber, the pre-polymerization phase can be carried out not only in bulk but also in water with or without the use of surfactants. If the pre-polymerization is carried out in a "water-in-oil" emulsion, the distribution and size of the rubber particles in the polystyrene, in the end products, is comparable to the distribution and size of the rubber particles in the polystyrene in the end products resulting from bulk pre-polymerization. If, on the contrary, the polymerization occurs in an "oil-in-water" emulsion, the distribution and size of the rubber particles in the polystyrene is wholly unsatisfactory. Pre-polymerization in the presence of water only, in the absence of surfactants, yields a product of no practical utility even if the distribution of the rubber particles in the polystyrene is better than in the end products obtained by pre-polymerization in oil-in-water emulsion.

THE PRESENT INVENTION

An object of this invention is to produce crude graft products of styrene on polyolefinic rubber in which the gel has a polystyrene/rubber ratio higher than 1:1 and which graft products are characterized by satisfactory distribution of the rubber particles in the polystyrene.

That and other objects which will appear hereinafter are achieved by this invention in accordance with which crude grafts containing gels having a polystyrene/rubber ratio shifted toward high polystyrene contents, in all instances higher than 1:1 and exhibiting, moreover, a satisfactory distribution of the rubber particles in the polystyrene matrix are obtained by conducting the pre-polymerization in water, in the absence of surfactants and so that, during the polymerization reaction the aqueous phase is not present as an emulsion in oil and the organic phase is not emulsified in the aqueous phase.

In practice, the process of this invention is carried out as follows:

A solution of the polyolefinic elastomer in styrene is prepared and a radical initiator, a chain transfer agent, and the required amount of water is added. The resulting mass is heated to a temperature of from 50° to 150° C, preferably from 80° to 120° C, until 15 to 40% of the styrene is converted to polystyrene. Alternatively, the polyolefinic rubber can be dissolved in the styrene in the presence of the water, reaction being completed in an aqueous suspension in the usual way, that is by injecting a concentrated aqueous solution of one or more suspending agents containing the selected radical initiator into the reactor and subjecting the mass to vigorous stirring while heating it at a temperature of from 150° to 200° C.

On completion of the reaction, the crude graft product is discharged from the reactor in the form of pearls which are washed and then dried.

The crude graft products obtained by the present process are characterized by a weight ratio of polystyrene of the gel to total rubber which is higher than 1.0, and comprised between 1.0 and 1.8. Because of the above indicated high ratio the crude products show a high compatibility of the polyolefinic elastomer with the polystyrene matrix, by reason of which the end products have valuable mechanical and impact resistance characteristics, especially when the rubber content in the crude product is high.

The EPR elastomers which can be used in the process of this invention consist of saturated copolymers of ethylene with an alpha-olefin having 3–6 carbon atoms, the preferred alpha-olefin being propylene, while the EPDM elastomers consist of unsaturated copolymers of ethylene with at least one alpha-olefin as above and with at least one linear or cyclic, conjugated or unconjugated diene or polyene hydrocarbon such as: butadiene, isoprene, 1,3-pentadiene, 1,4-pentadiene, 1,4-hexadiene, 1,5-hexadiene, 1,4,9-decatriene, 1,9-decadiene, alkenyl-norborenes such as 5-methylene-2-norbornene and 5-vinyl-2-norbornene, norbornadienes such as 2-alkyl-2,5-norbornadienes, alkylidene-norbornenes such as 5-ethylidene-2-norbornene (ENB), cyclodienes such as 1,5-cyclo-octadiene, bicyclo [2,2,2] octa-2,5-diene, cyclopentadiene and others.

Preferred terpolymers are the ethylene/propylene/5-ethylidene-2-norbornene terpolymers. Both the saturated as well as the unsaturated copolymers contain propylene in quantities comprised between 15 and 60% by moles, the quantity of diene or polyene in the unsaturated copolymers being comprised between 0.1 and 20% by moles.

As radical initiators there may be used azo-derivatives such as azo-bis-isobutylonitrile, or peroxide compounds such as benzoyl peroxide, t-butyl peroxide, n-butyl 3,3-di (t-butylperoxy)-valerate, and still others.

Chain transfer agents that may be used are the mercaptans, for instance t-dodecyl-mercaptan and terpinolene.

The weight ratio water/oil phase may vary within wide limits comprised between 0.3 and 2, but preferably between 0.5 and 1.

The end products are subjected to the following analyses:

Determination of free polystyrene 3 grams of the dry product in pearls are added to 100 cc of methyl-ethyl-ketone (solvent of polystyrene) and the mixture is then stirred. Thereby, a dispersion is obtained which is centrifuged and the solid part, consisting of gel and free rubber, is dried and weighed. The free polystyrene may be determined by difference.

The liquid, separated by centrifugation, is then concentrated and treated with an excess of methanol; in this way the free polystyrene precipitates and its intrinsic viscosity may be determined in toluene at 30° C.

Determination of the free rubber and of the gel

The residue of the extraction with methyl-ethyl-ketone, dried and weighed, is extracted at room temperature with an excess of n-heptane (solvent of the free rubber) for 24 hours. By filtration, the undissolved part (gel) is separated and, after washing and drying, is weighed. The free rubber may be calculated by difference or also directly determined by evaporation of the heptane extract in a calibrated flask and subsequent weighing of the evaporation residue.

Keeping in mind that the content of total rubber in the crude reaction product is known, by difference it is possible to go back to the composition of the gel. The result thus found may be confirmed by determining, by IR analysis, for instance the styrene content of the gel.

Unexpectedly the process of this invention allows to obtain the following advantages in comparison with the known processes for grafting styrene on EPR or EPDM rubbers: a higher grafting yield also in the case that EPR elastomers are used, which result was altogether unforeseeable because it could not be expected that water, inert towards the reactants, could influence the course of the reaction; the possibility of subjecting to polymerization solutions of rubber in styrene with a high rubber concentration which may even attain 30%.

This means that a higher output is obtained from the installations inasmuch as they produce crude graft products with a greater content of total rubber. In the conventional processes in practice rubber contents exceeding 10% were not used.

The runs were carried out using the following reactants:
— styrene
t-butyl peroxide (DTBP)
n-butyl 3,3-di(t-butylperoxy)-valerate (3,3-DTBE)
t-dodecyl-mercaptan.
Elastomers (the percentages are by weight):
A:Ethylene/propylene copolymer
40% propylene — Mooney viscosity ML (1+4') at 100° C = 40.

B:Ethylene/propylene/ENB terpolymer.
50% propylene — 3.5% ENB — Mooney viscosity ML (1+4') at 100° C = 50.
C:Ethylene/propylene/ENB terpolymer:
33% propylene — 9% ENB — Mooney viscosity ML (1+4') at 100° C = 62.

The operational conditions and the results of some analyses carried out on the products obtained are recorded in Table I.

These products, either as such or after dilution with polystyrene until the desired content of total rubber was reached, were homogenized and compression molded (at 190° C and 40 kg/sq.cm) in order to get test pieces for the determination of the mechanical properties of the materials. Said properties are recorded in Table II, in which are also recorded, for purely comparative purposes, the mechanical properties of a conventional, impact resistant, polybutadiene-based polystyrene containing 10% of total rubber.

In Table I the percentages (by weight) of the chain transfer agent and of the radical initiators are intended to be referred to rubber + styrene (either in the state of monomer or polymer), and by the term "grafting yield" is meant the ratio polystyrene of the gel/styrene made to react.

EXAMPLE 1

Into a 1.8 lt reactor fitted with a stirrer, were charged 100 g of elastomer C, 400 grams of styrene and 400 grams of water containing in solution 2.7 g of $Na_2SO_4.10 H_2O$.

The reactor was placed in a bath thermostatically adjusted at 50° C, and the reaction mass was stirred until a concentrated solution of the rubber in the monomer was obtained. To the mixture were then added: 0.048% by weight (with respect to rubber + styrene) of DTBP; 0.03% b.w. of 3,3-DTBE and 0.022% b.w. of t-dodecylmercaptan. The bath was then brought up to 100° C and, maintaining the reaction mass under stirring, the polymerization was left to go on for 4 hours. Thereafter to the reaction mixture were added:

3% of mineral oil
0.4% of DTBP
0.34% of an acrylic acid/2-ethylhexyl acrylate copolymer (suspending agent) 0.5% of a condensation product formaldehyde-sodium naphthalenesulphonate (suspending agent).

The two suspending agents indicated above were added dissolved in 100 grams of water.

The above given by-weight percentages are referred to the sum of the rubber and styrene monomer and polymer. The stirring speed was then increased and the reaction mixture was heated according to the following cycle: 1 hour at 120° C; 2 hrs. at 140° C; and 3 hours at 155° C. Subsequently the bath was cooled down and about 500 g of material in the form of pearls containing 20% of total rubber was recovered. The material thus obtained was diluted with polystyrene to 10% of total rubber and was then admixed with:

0.1% Irganox 1076, produced by CIBA-Geigy (a specific antioxidant for the elastomer used).
0.2% of 2,6-di-t-butyl-p-cresol (another anti-oxidant)
0.25% of stearic acid (lubricant)

The mixture was homogenized in a double-screw extruder which delivers the material in the form of granules. The test pieces for the determination of the mechanical properties were obtained from compression molded plates (190° C and 40 kg/sq.cm) starting from the granulate.

EXAMPLE 2 - 5

These runs were carried out according to the procedures already described in Example 1. The operational conditions, the reactants used, the result of the analyses and the mechanical properties of the materials obtained in the various runs are recorded in the following two tables.

COMPARATIVE EXAMPLES 1A - 3A

The runs of these examples were carried out according to the procedures already described for the run of Example 1; with the only difference that no water was used in the prepolymerization phase.

The operational conditions, the reactants used, the results of the analyses and the mechanical properties of the materials obtained are recorded in the following two tables.

from 3 to 6 carbon atoms or on low unsaturation polyolefinic elastomers consisting of copolymers of ethylene with at least one of said alpha-olefins and at least one diene or polyene hydrocarbon, in which graft products the by-weight ratio polystyrene of the gel/total rubber is greater than 1.0 and not greater than 1.8, said process comprising heating a mixture containing the styrene, the elastomer and a radical initiator in two phases, the first phase being conducted between 50° and 150° C, in the presence of water in a by-weight ratio water/oily phase comprised between 0.3 and 2, operating in the absence of surfactants, until a styrene conversion comprised between 15 and 40% is reached; and the second phase being carried out by suspension polymerization with the aid of one or more suspending agents and of a radical initiator, while stirring the reaction mass and heating it at temperatures up to 150° to 200° C.

2. The process according to claim 1, in which the polyolefinic elastomer is an ethylene-propylene copolymer.

TABLE I

Graft Polymerization of Styrene on Polyolefinic Elastomers-Pre-Polymerization Temp.:100° C-Suspension Polymerization-Thermal Cycle: 1 hr at 120° C; 2 hrs at 140° C; 3 hrs at 155° C - Chain Transfer Agent: T-Dodecylmercaptan = 0.022% added at the start.

| Run No. | ELASTOMER Type | % in solution in styrene | Prepolymerization Radical initiators Type % | Type % | Time | Ratio b.w. $H_2O$/oily phase: | Styrene convers % | Suspension Polymerization Radical initiator Type | % | Analysis of Crude Graft Product ELAST. of gel % with respect to total ELAST. | GEL % w.resp. to crude prod. | PST % in gel | % PST in gel w. respect to crude prod. | Yield grafting |
|---|---|---|---|---|---|---|---|---|---|---|---|---|---|---|
| 1 | C | 20 | OTBP-0.048 | 3.3-DTBE-0.03 | 4 h | 1 : 1 | | DTBP | 0.4 | 100 | 48 | 58.3 | 28 | 0.35 |
| 1A | C | 10 | " | " | 8h 15m | without $H_2O$ | 26 | " | 0.4 | 96 | 20.1 | 52.2 | 10.5 | 0.11 |
| 2 | C | 10 | " | " | 8h | 1 : 1 | | " | 0.4 | 97.5 | 26.6 | 63.3 | 16.9 | 0.18 |
| 2A | B | 10 | " | " | 8h 15m | without $H_2O$ | 30 | " | 0.4 | 81 | 17.7 | 54.2 | 9.6 | 0.10 |
| 3 | B | 10 | " | " | 8h 15m | 1 : 1 | | " | 0.4 | 95.2 | 22.3 | 57.4 | 12.8 | 0.14 |
| 4 | B | 20 | " | " | 4 h | 1 : 1 | | " | 0.4 | 96 | 45.1 | 57.4 | 25.9 | 0.32 |
| 5 | A | 20 | " | " | 4 h | 1 : 1 | | " | 0.4 | 91 | 43.5 | 58.2 | 25.4 | 0.31 |
| 3A | A | 10 | " | " | 8h 15m | without $H_2O$ | 26 | " | 0.4 | 81 | 14.4 | 43.7 | 6.3 | 0.07 |

ELAST = elastomer
PST = polystyrene

TABLE II

MECHANICAL PROPERTIES

| Run No. | Total rubber in crude graft product - % | Total rubber in product after dilution w. PST - % | IZOD resiliency at 23° C (ASTM-D256) kg cm/cm | Flexural modulus (ASTM-D 790 kg/sq.cm | Elongation at break (ASTM-D 1822-61 T/S) % | ROCKWELL hardness R-scale (ASTM-D 785) | Breaking load (ASTM-D1822-61 T/S) kg/sq.cm | Yield point (ASTM-D1822-61 T/S) kg/sq.cm |
|---|---|---|---|---|---|---|---|---|
| 1 | 20 | 10 | 8.0 | 22600 | 7.4 | 96 | 236 | 279 |
| 1A | 10 | 10 | 9.4 | 18400 | 12.5 | 83 | 169 | 200 |
| 2 | 10 | 10 | 8.5 | 11000 | 29.2 | 52 | 172 | 109 |
| 2A | 10 | 10 | 12.0 | 20200 | 10.1 | 89 | 176 | 237 |
| 3 | 10 | 10 | 9.4 | 12600 | 16.5 | 57 | 148 | 131 |
| 4 | 20 | 10 | 11.0 | 16300 | 8.0 | 73 | 180 | — |
| 5 | 20 | 10 | 14.35 | 19500 | 7.8 | 87 | 220 | 241 |
| Conventional impact resistant polybutadiene-based polystyrene containing 10% of total rubber | | | 7.4 | 13500 | 45.5 | 53 Scale L) | 205 | 280 |

We claim:

1. Process for preparing crude graft products of styrene on saturated polyolefinic elastomers consisting of copolymers of ethylene with alpha-olefins containing 3. The process according to claim 1, in which the polyolefinic elastomer is an ethylene-propylene-diene terpolymer.

* * * * *

UNITED STATES PATENT OFFICE
CERTIFICATE OF CORRECTION

Patent No. 4,001,349          Dated January 4, 1977

Inventor(s) Febo SEVERINI et al

It is certified that error appears in the above-identified patent and that said Letters Patent are hereby corrected as shown below:

Col. 2 - Line 61,      "alkenyl-norborenes" should be

- - - alkenyl-norbornenes - - -.

Cols. 5 - 6
      Table 1,      under the heading

Radical Initiators Type %,

"OTBP-0.048" should be

- - - DTBP-0.048 - - -.

Signed and Sealed this twelfth Day of July 1977

[SEAL]

Attest:

RUTH C. MASON                  C. MARSHALL DANN
*Attesting Officer*             *Commissioner of Patents and Trademarks*